United States Patent
Gal et al.

(10) Patent No.: US 12,458,991 B2
(45) Date of Patent: Nov. 4, 2025

(54) OLFACTOGRAM TECHNIQUES

(71) Applicant: iRoma Scents A.B. Ltd., Herzliya (IL)

(72) Inventors: Avner Gal, Herzliya (IL); Eugene Naidis, Ashkelon (IL)

(73) Assignee: iRomaScents A.B. Ltd., Herzliya (IL)

( * ) Notice: Subject to any disclaimer, the term of this patent is extended or adjusted under 35 U.S.C. 154(b) by 0 days.

(21) Appl. No.: 18/808,272

(22) Filed: Aug. 19, 2024

(65) Prior Publication Data

US 2025/0073731 A1    Mar. 6, 2025

Related U.S. Application Data

(60) Provisional application No. 63/579,415, filed on Aug. 29, 2023.

(51) Int. Cl.
  *B05B 12/02*    (2006.01)
  *G01F 9/00*     (2006.01)

(52) U.S. Cl.
  CPC .............. *B05B 12/02* (2013.01); *G01F 9/001* (2013.01)

(58) Field of Classification Search
  CPC ....................................................... B05B 12/02
  See application file for complete search history.

(56) References Cited

U.S. PATENT DOCUMENTS

| 4,142,650 | A | 3/1979 | Almouli |
| 7,610,118 | B2 | 10/2009 | Schramm et al. |
| 7,837,065 | B2 | 11/2010 | Furner et al. |
| 10,814,028 | B2 | 10/2020 | Becker et al. |
| 2016/0107186 | A1 | 4/2016 | Chao et al. |
| 2018/0369442 | A1 | 12/2018 | Kelsen |
| 2019/0263527 | A1* | 8/2019 | Fantuzzi ................. B01F 25/00 |
| 2020/0147256 | A1 | 5/2020 | Nguyen et al. |

(Continued)

FOREIGN PATENT DOCUMENTS

| KR | 101173541 B1 | 8/2012 |
| WO | 2009006851 A1 | 1/2009 |

(Continued)

OTHER PUBLICATIONS

International Search Report for PCT/IB2024/058056, dated Oct. 31, 2024. Searching Authority, Israel Patent Office, Jerusalem, Israel.

(Continued)

*Primary Examiner* — Kevin Joyner
(74) *Attorney, Agent, or Firm* — M&B IP Analysts, LLC

(57) ABSTRACT

A system and method for delivering olfactograms. A method includes determining a scent availability of a scent dispensing device based on a plurality of scent essence statuses, wherein each scent essence status at least includes an amount of a respective scent essence disposed in the scent dispensing device; causing a plurality of scent options to be presented to a user via a user device, wherein the plurality of scent options is based on the scent availability; generating data indicating at least one scent to be dispensed by the scent dispensing device based on at least one user input provided by the user via the user device in response to the presentation of the plurality of scent options to the user; and transmitting the generated data, wherein the scent dispensing device is configured to dispense the at least one scent based on the transmitted data.

17 Claims, 13 Drawing Sheets

(56) References Cited

U.S. PATENT DOCUMENTS

2020/0276353 A1   9/2020   Juving-Brunet
2023/0285623 A1   9/2023   Jones et al.

FOREIGN PATENT DOCUMENTS

WO   2011021980 A1   2/2011
WO   2023119275 A1   6/2023

OTHER PUBLICATIONS

Written Opinion of the Searching Authority for PCT/IB2024/058056, dated Oct. 31, 2024. Searching Authority, Israel Patent Office, Jerusalem, Israel.
International Search Report for PCT/IL2022/051351, dated Mar. 29, 2023. International Searching Authority Israel Patent Office Jerusalem, Israel.
Written Opinion of the International Searching Authority for PCT/IL2022/051351, dated Mar. 29, 2023. International Searching Authority Israel Patent Office Jerusalem, Israel.

\* cited by examiner

OLFACTOGRAM TECHNIQUES

CROSS-REFERENCE TO RELATED APPLICATIONS

This application claims the benefit of U.S. Provisional Patent Application No. 63/579,415 filed on Aug. 29, 2023. This application also relates to PCT Application No. PCT/IL2022/051351 filed on Dec. 20, 2022, which claims the benefit of U.S. Provisional Patent Application No. 63/265,729 filed on Dec. 20, 2021.

All of the applications referenced above are hereby incorporated by reference.

TECHNICAL FIELD

The present disclosure relates generally to scent-based messages, and more specifically to techniques for sending messages containing or associated with data used for producing scents.

BACKGROUND

Messaging applications provide a variety of ways for users to express themselves. Different kinds of messages allow for shorthand communications. For example, an emoji is a kind of pictogram or ideogram which represents a concept or statement using a visual icon. New forms of communication may provide users with new ways to express themselves. New ways to communicate, particularly ways which are compatible with existing messaging services, are desirable. Additionally, devices and techniques supporting such new ways to communicate are also desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for delivering olfactograms. The method comprises: determining a scent availability of a scent dispensing device based on a plurality of scent essence statuses, wherein each scent essence status at least includes an amount of a respective scent essence disposed in the scent dispensing device; causing a plurality of scent options to be presented to a user via a user device, wherein the plurality of scent options is based on the scent availability; generating data indicating at least one scent to be dispensed by the scent dispensing device based on at least one user input provided by the user via the user device in response to the presentation of the plurality of scent options to the user; and transmitting the generated data, wherein the scent dispensing device is configured to dispense the at least one scent based on the transmitted data.

Certain embodiments disclosed herein also include a non-transitory computer readable medium having stored thereon causing a processing circuitry to execute a process, the process comprising: determining a scent availability of a scent dispensing device based on a plurality of scent essence statuses, wherein each scent essence status at least includes an amount of a respective scent essence disposed in the scent dispensing device; causing a plurality of scent options to be presented to a user via a user device, wherein the plurality of scent options is based on the scent availability; generating data indicating at least one scent to be dispensed by the scent dispensing device based on at least one user input provided by the user via the user device in response to the presentation of the plurality of scent options to the user; and transmitting the generated data, wherein the scent dispensing device is configured to dispense the at least one scent based on the transmitted data.

Certain embodiments disclosed herein also include a system for delivering olfactograms. The system comprises: a processing circuitry; and a memory, the memory containing instructions that, when executed by the processing circuitry, configure the system to: determine a scent availability of a scent dispensing device based on a plurality of scent essence statuses, wherein each scent essence status at least includes an amount of a respective scent essence disposed in the scent dispensing device; cause a plurality of scent options to be presented to a user via a user device, wherein the plurality of scent options is based on the scent availability; generate data indicating at least one scent to be dispensed by the scent dispensing device based on at least one user input provided by the user via the user device in response to the presentation of the plurality of scent options to the user; and transmit the generated data, wherein the scent dispensing device is configured to dispense the at least one scent based on the transmitted data.

Certain embodiments disclosed herein include a method, non-transitory computer readable medium, or system as noted above or below, further including or being configured to perform the following step or steps: generating a plurality of scent dispensing instructions, wherein the plurality of scent dispensing instructions includes instructions for causing the scent dispensing device to dispense the at least one scent, wherein the generated data includes the plurality of scent dispensing instructions.

Certain embodiments disclosed herein include a method, non-transitory computer readable medium, or system as noted above or below, wherein the scent dispensing device includes a drum having a plurality of chambers and a plurality of actuators, wherein each chamber of the plurality of chambers is adapted to receive a respective scent essence of the plurality of scent essences, wherein each actuator of the plurality of actuators is adapted to induce emission of the scent essence of a respective chamber of the plurality of chambers, wherein the plurality of scent dispensing instructions includes instructions for causing a motor to drive application of pressure on at least one actuator of the plurality of actuators in order to induce emission of at least one scent essence of the plurality of scent essences from at least one chamber of the plurality of chambers.

Certain embodiments disclosed herein include a method, non-transitory computer readable medium, or system as noted above or below, wherein the plurality of scent dispensing instructions is generated based on at least one condition, wherein the scent dispensing device is configured to dispense the at least one scent when the at least one condition has been met.

Certain embodiments disclosed herein include a method, non-transitory computer readable medium, or system as noted above or below, wherein the generated data is transmitted to a recipient device associated with the scent dispensing device, wherein the at least one condition includes a condition requiring that a user of the recipient device approves dispensing of the at least one scent.

Certain embodiments disclosed herein include a method, non-transitory computer readable medium, or system as noted above or below, wherein the at least one condition includes a condition requiring that the scent availability of the scent dispensing device includes an amount of each of at least one scent essence among the plurality of scent essences which corresponds to a predetermined amount of each of the at least one scent essence for the at least one scent to be dispensed by the scent dispenser.

Certain embodiments disclosed herein include a method, non-transitory computer readable medium, or system as noted above or below, wherein the amount of each scent essence status is an amount of scent essence fluid of the respective scent essence in the scent dispensing device, wherein the plurality of scent dispensing instructions indicates an amount of each scent essence to be dispensed.

Certain embodiments disclosed herein include a method, non-transitory computer readable medium, or system as noted above or below, further including or being configured to perform the following step or steps: identifying at least one attachment, wherein the generated data includes the at least one attachment, wherein the generated data is sent to a recipient device associated with the scent dispensing device.

Certain embodiments disclosed herein include a method, non-transitory computer readable medium, or system as noted above or below, wherein the scent dispensing device is a first scent dispensing device of a plurality of scent dispensing devices, wherein each of the plurality of scent dispensing devices is configured to dispense the at least one scent based on the transmitted data.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
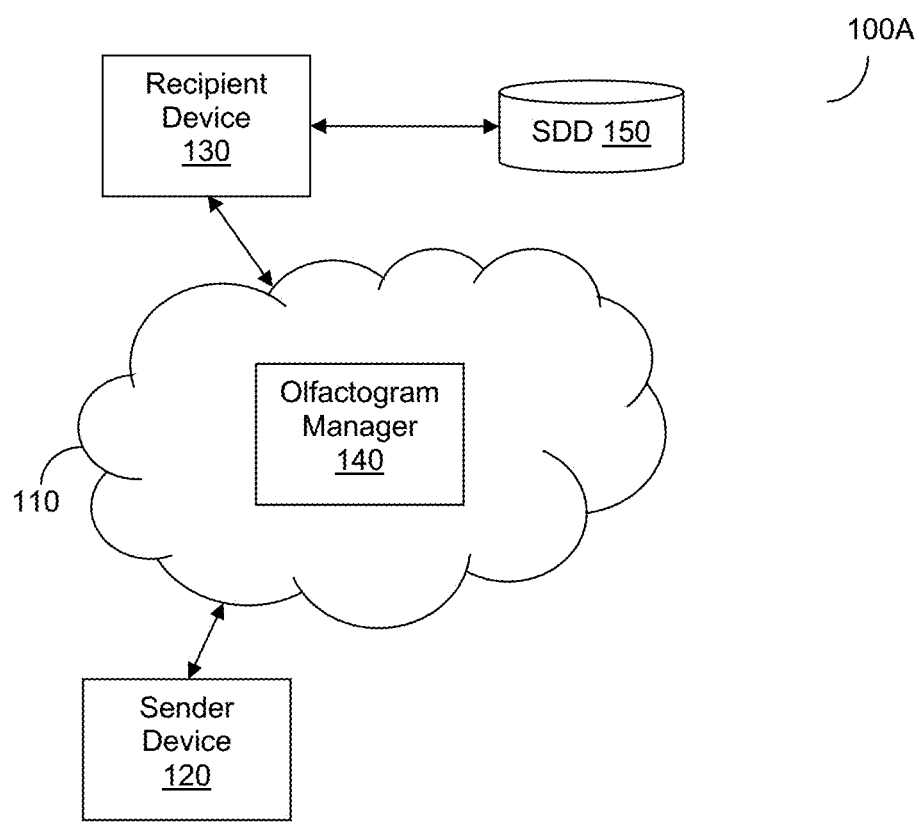
FIGS. 1A-B are network diagrams utilized to describe various disclosed embodiments.

The various disclosed embodiments include techniques for providing communicable scents in the form of olfactograms. The olfactograms are scents or combinations of scents delivered to a recipient based on inputs provided by a sender. Specifically, the olfactogram may be realized via a scent or combination of scents delivered by a scent dispensing device configured to selectively disperse scents in a surrounding environment. In this regard, the disclosed embodiments provide techniques for transmitting messages including or otherwise in the form of scents which may open up new means of communicating via olfactory senses.

Like an emoji or Graphic Interchange Format (GIF) file, the disclosed olfactograms may be utilized to provide a shorthand for written or verbal communications, or may otherwise allow for new ways of expressing communications via computing devices which were previously unavailable. In this regard, olfactograms sent and delivered in accordance with various disclosed embodiments may act like "scent emojis" in which a sender of a message may select an icon representing a particular scent to be delivered as part of an olfactogram through a messaging application.

To this end, various disclosed embodiments include techniques for utilizing network-connected devices such as Internet of Things (IoT) devices in order to deliver the olfactograms based on communications sent via networks such as the Internet. Certain disclosed techniques further include methods for attaching olfactograms to other data, for condition-based scent dispersal of olfactograms, and the like.

Various disclosed embodiments utilize a network-connected device such as, but not limited to, a scent dispensing device. Such a device may be connected to a network directly (e.g., through a network interface of the device) or indirectly (e.g., via communication with another, network-connected, device). In accordance with such embodiments, such a network-connected scent dispensing device is at least configured to receive transmissions including olfactograms and to disperse scents based on the received olfactograms via one or more networks at a location of deployment which may be, but is not limited to, a location at which the recipient is also located. In such an embodiment, the scent dispensing device is configured to electronically control scent production in accordance with scent information included among the received olfactograms.

In some embodiments, the scent dispensing device includes a multi-chamber drum having a body including multiple chambers, where each chamber is adapted to receive a respective scent essence. In such an embodiment, the drum may further include actuators, which each actuator having an actuator port adapted to be aligned in a selected direction in relation to the body. The scent dispensing device may further include motors such as a first motor configured to drive application of pressure in one of the actuators so as to induce emission of a scent essence through the respective actuator port. The second motor is configured to drive displacement of at least a portion of the body.

In an embodiment utilizing such a scent dispensing device, a control unit communicatively connected to the motors is configured to selectively activate the second motor in response to receiving scent emission instructions in order to displace the body, thereby aligning one of the actuator ports of a selected actuator with respect to a selected chamber. The control unit is further configured to selectively activate the first motor in order to induce emission of the scent essence contained in the selected chamber through the actuator port of the selected actuator. An example scent dispensing device which may be utilized in accordance with various disclosed embodiments is described further in PCT Application No. PCT/IL2022/051351.

To further support various disclosed embodiments, some embodiments may further utilize sensors or other mechanisms deployed in the scent dispensing device in order to detect a level of scent essence in each chamber (e.g., a fluid level of the scent essence). The sensors may provide data in the form of signals to one or more computing components installed in or communicatively connected to the scent dispensing device in order to report the scent essence levels in the scent dispensing device.

In such embodiments, a sender device may communicate with the scent dispensing device in order to request data indicating statuses of the scent essence levels. Further, the scent essence level data may be utilized by the sender device in order to determine potential scent options available for olfactograms. In some implementations, one or more predetermined scent options may correspond to respective scent essences or combinations of scent essences in certain amounts.

The predetermined scent options may be represented by, for example but not limited to, icons displayed via a graphical user interface such that, when a user selects an icon corresponding to one of the scent options, instructions to emit the scent essences of the respective combination of scent essences are sent to the scent dispensing device. Further, in some implementations, icons corresponding to scent options which are not currently capable of being produced by the scent dispensing device (e.g., because the scent dispensing device does not have chambers corresponding to one or more of the scent essences of the combination or otherwise does not have sufficient scent availability, for example, a sufficient amount of scent essence to emit a particular scent) may be greyed out or otherwise not presented as potential options on a sender device (e.g., by being greyed out in a graphical user interface of a chat program configured with scent transmission functionality as described herein). In some implementations, these potential options may be visually illustrated as a map of scents in a scent dispensing device of a recipient from among which scents may be selected in order to send an olfactogram for activating dispensing of the selected scents.

FIG. 1A shows an example network diagram 100A utilized to describe the various disclosed embodiments. In the network diagram 100A, a sender device 120 and a recipient device 130 communicate via a cloud computing platform 110. More specifically, an olfactogram manager 140 is configured to accept inputs indicating olfactograms to be sent by the sender device 120, and to transmit instructions for dispensing scents as olfactograms or other data used for determining scents to be produced by a scent dispensing device such as the scent dispensing device (SDD) 150.

The cloud computing platform 110 may be, may include, or may otherwise communicate via any or all of the following: a wireless, cellular or wired network, a local area network (LAN), a wide area network (WAN), a metro area network (MAN), the Internet, the worldwide web (WWW), similar networks, and any combination thereof.

Each of the sender device 120 and the recipient device 130 may be, but is not limited to, a personal computer, a laptop, a tablet computer, a smartphone, a wearable computing device, or any other device capable of receiving and displaying notifications. In accordance with various disclosed embodiments, the sender device 120 has installed thereon software (e.g., in the form of a software application) for one or more messaging services configured to utilize olfactograms as discussed herein. The recipient device 130 may also have installed thereon such software. Alternatively or in combination, the recipient device 130 may have software installed thereon for managing or otherwise interacting with the SDD 150. Such software may include, but is not limited to, software for acknowledging receipt, indicating proximity of the recipient device 130 to the SDD 150, or otherwise approving delivery of an olfactogram via the SDD 150.

It should be noted that the olfactogram manager 140 is depicted as communicating with the recipient device 130 and not directly with the SDD 150 merely for example purposes, and that in at least some implementations, the olfactogram manager 140 may communicate with the SDD 150 instead of or in addition to communicating via the recipient device 130.

Figure 1B:
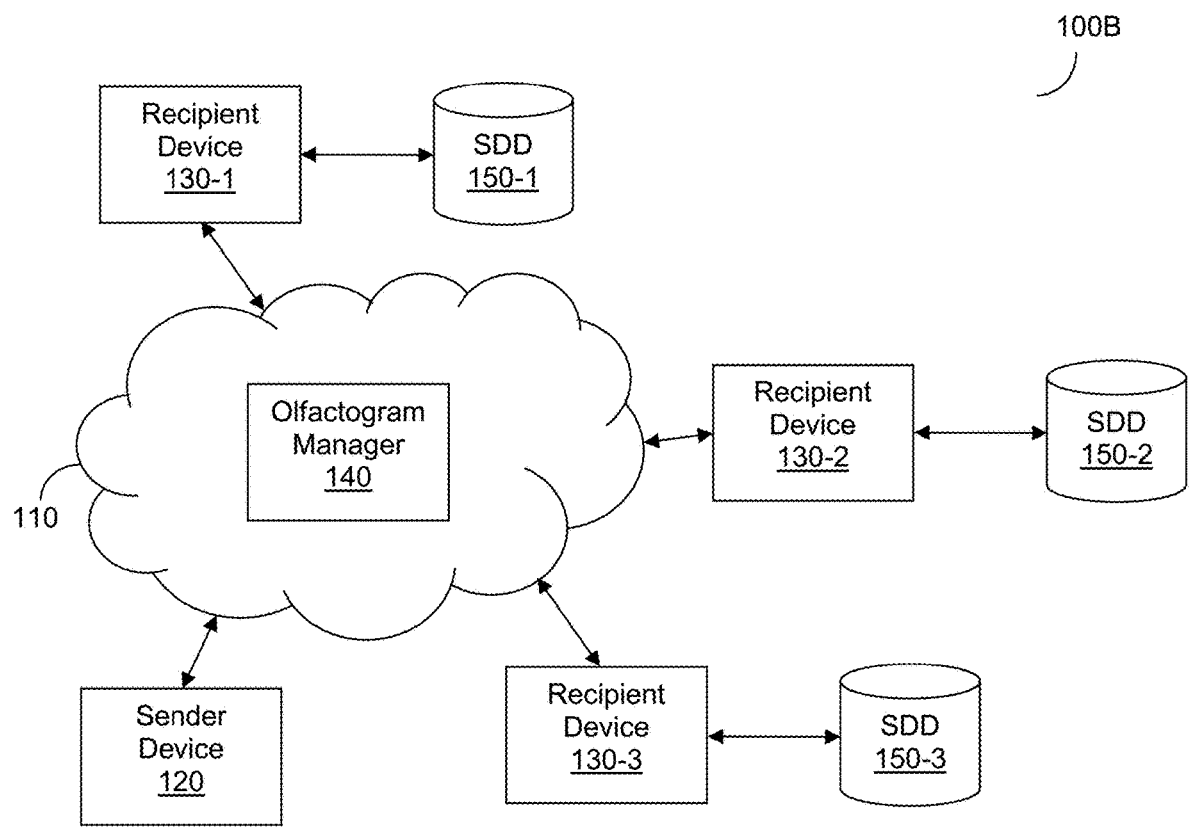

FIG. 1B shows an implementation 100B involving multiple recipient devices 130-1 through 130-3 and respective SDDs 150-1 through 150-3. The implementation depicted in FIG. 1B may be utilized, for example but not limited to, for group texts in which a user of the sender device 120 sends an olfactogram to multiple users of the recipient devices 130-1 through 130-3 via the same message. In such an implementation, a group chat may include multiple users, and a message sent to some of those users may be accompanied by respective olfactogram data.

It should be noted that the sender device 120 and the recipient device 130 are labeled as "sender" and "recipient," respectively, but that the sender device may be configured to receive messages and the recipient device may be configured to send messages without departing from the scope of the disclosure. Such labels are utilized in the context of a given interaction involving sending an olfactogram and are not limiting on the capabilities of either device.

Figure 2:
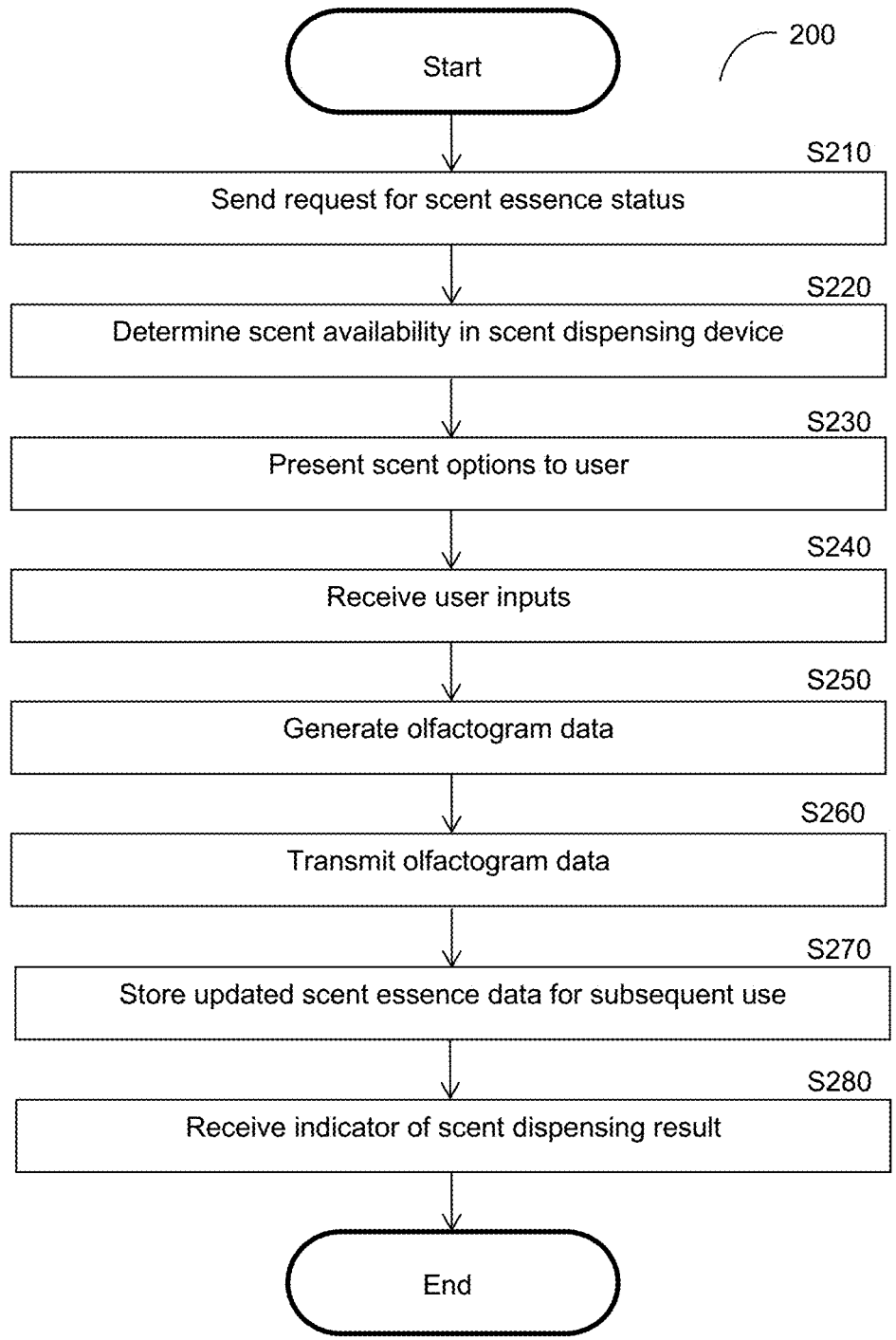
FIG. 2 is a flowchart illustrating a method for transmitting olfactograms according to an embodiment.

FIG. 2 is a flowchart 200 illustrating a method for transmitting olfactograms according to an embodiment. In an embodiment, the method is performed by the sender device 120, FIG. 1A.

At S210, one or more requests for a scent essence status is sent. The requested scent essence status may be, for example, a request for an amount of each scent available in a scent dispensing device of a potential recipient of an olfactogram. To this end, the requests may be sent based on user inputs such as, but not limited to, a selection of one or more recipients, a selection of a scent or combination of scents, both, and the like. Each request may be sent to a recipient device (e.g., one of the recipient device 130-1 through 130-3, FIG. 1B) of a selected recipient which is in communication with a scent dispensing device (e.g., one of the SDDs 150-1 through 150-3, FIG. 1B). Alternatively or in combination, each request may be sent directly to a respective scent dispensing device.

In various embodiments, such a request is sent in order to allow for determining an availability of certain scents in the scent dispensing device of the recipient. Such a determination may be utilized, for example, in order to determine whether the scent dispensing device has sufficient scent availability, for example, a sufficient amount of each scent needed to produce a desired scent or combination of scents (e.g., the selected scent or combination of scents). In some implementations, the request may be for a scent essence status of each scent in the respective scent dispensing device. Determining scent availability may be utilized in order to check whether a given scent dispensing device will be capable of delivering the selected scent or combination of scents, and may further be utilized to limit the scent options to be presented to a user when scent essence status is requested for an amount of each scent in each scent dispensing device.

In an embodiment, the requested scent essence statuses may be returned as an amount of each requested scent in a respective scent dispensing device. Such an amount may be represented as, for example, a value on a predetermined scale (e.g., from 0 to 10), a liquid volume, or any other measurement of an amount of material available for a given scent in the scent dispensing device. In an example implementation, such amounts may correspond to respective chambers or other containers including scent material (e.g., scented liquid) in the respective scent dispensing device.

At S220, scent availability is determined based on the requested scent essence status. The scent availability may be defined, for example, with respect to an amount of each scent essence in the scent dispensing device. As a non-limiting example, when the scent dispensing device has multiple chambers with respective scent essence fluids disposed therein, an amount of the respective scent essence fluid (e.g., a fluid level, mass, volume, etc.) disposed in each chamber may be utilized to determine the scent essence status of the scent corresponding to the scent essence fluid in each chamber.

In some embodiments, S220 further includes determining availability for certain combinations of scents. As a non-limiting example, certain combinations of scents may be predefined as corresponding to scent options to be presented to users. These combinations of scents may be further defined with an absolute or relative amount of fluid of different scent essences needed to produce a given combination of scents. As a non-limiting example using absolute values for fluids of scent essences, a combination of scents may be defined as using 1 milliliter (mL) of a first scent, 0.5 mL of a second scent, and 0.75 mL of a third scent. As a non-limiting example using relative values for fluids of scent essences, a combination of scents may be defined as using 1 part of a first scent, 2 parts of a second scent, and ½ part of a third scent.

In some embodiments, the scent essence status may be requested and utilized to determine scent availability in the scent dispensing device periodically or otherwise on a regular basis. Such period or regular updating of scent availability may allow for maintaining a current scent availability for the scent dispensing device, for example, in order to accurately present available scent options to the user over time as the scent dispensing unit is refilled, emits other scents, both, and the like.

At S230, scent options are presented to a user. In an embodiment, the scent options presented to a user include scent options for which the requisite amounts of scent essence are present in an intended recipient's scent dispensing device. In some embodiments, S230 includes causing scent options to be presented to a user, e.g., by sending the scent options to a user device of the user.

In some implementations, the scent options may be presented as part of a graphical user interface (GUI), for example an interface of a messaging service. Non-limiting example presentations of scent options via GUIs are discussed further below with respect to FIGS. 9A through 9D.

Returning to FIG. 2, at S240, user inputs are received with respect to the presented scent options. The user inputs include one or more scents to be emitted by the scent dispensing device owned, operated, or otherwise accessible to an intended recipient of the olfactogram. In some implementations, the user inputs may indicate an order of scents to be provided in sequence, i.e., such that the scent dispensing device of the recipient emits each scent in sequence according to the order.

In an embodiment, the user inputs further indicate additional content to be included as part of an olfactogram. Such content may include, but is not limited to, text, multimedia content, files, combinations thereof, portions thereof, and the like. Such content may be alongside the olfactogram, e.g., as additional data (beyond data indicating the scents to be emitted) to a recipient device.

In another embodiment, the user inputs may further define one or more conditions for dispensing the scents of the olfactogram. Such conditions may include, but are not limited to, requiring approval by the recipient (e.g., by acknowledging receipt of the olfactogram such as via the play button 950 depicted in FIG. 9D), a particular time or a passage of a particular amount of time (i.e., a time delayed scent dispensing), and the like.

At S250, olfactogram data is generated based on the user inputs. In an embodiment, the olfactogram data at least includes data indicating scents or combinations thereof to be emitted via a scent dispensing device, thereby delivering the olfactogram. In a further embodiment, the olfactogram data may include instructions for emitting scents via the scent dispensing device. The olfactogram data may further include additional content indicated by the user inputs as discussed with respect to S240.

Figure 3:
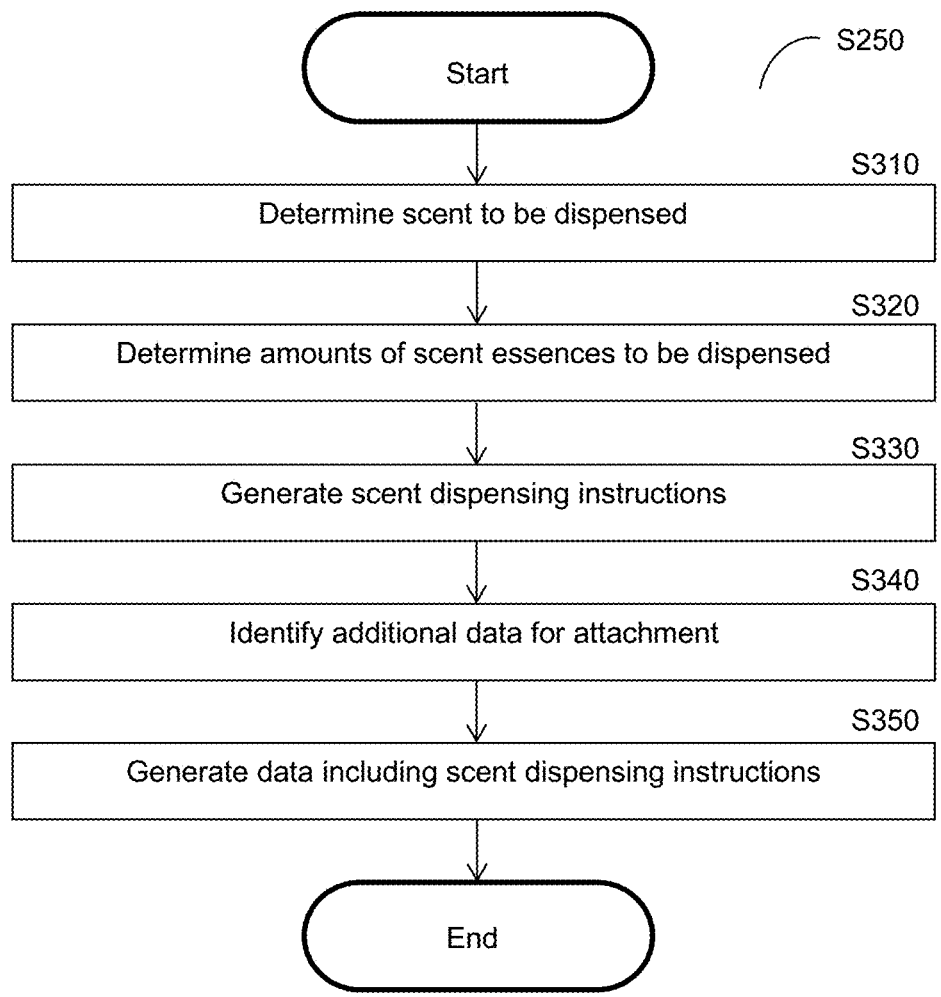
FIG. 3 is a flowchart illustrating a method for generating olfactogram data for transmission according to an embodiment.

In an embodiment, the olfactogram data is generated as now described with respect to FIG. 3. FIG. 3 is a flowchart S250 illustrating a method for generating olfactogram data for transmission according to an embodiment.

At S310, a scent to be dispensed is determined. In an embodiment, the scent to be emitted is determined based on user inputs such as, but not limited to, a selection of a scent or combination of scents (e.g., a predetermined combination of scents).

At S320, one or more amounts of scent essences to be dispensed is determined. In an embodiment, an amount of each scent essence needed to produce the scent to be dispensed is determined. The determined amounts may be predetermined values corresponding to the scent to be dispensed, and may be absolute values (e.g., 0.2 mL) or relative values (e.g., 20% by fluid volume of the total amount of scent to be dispensed). Moreover, the determined amounts may further correspond to an amount of scent to be provided to a user, for example but not limited to, an amount measured in a number of whiffs (e.g., an amount of scent essence to provide a certain number of whiffs to a recipient in proximity to the scent dispensing device).

At S330, scent dispensing instructions are generated based on the determined amounts of scent essences to be dispensed. The scent dispensing instructions at least indicate the amounts of scent essences to be dispensed, and may further include instructions for causing the scent dispensing device to dispense the scent determined at S310 by dispensing the applicable amounts of scent essences.

At optional S340, one or more attachments in the form of additional data to be attached to the scent dispensing instructions is identified. The attachments may include, for example, content indicated in user inputs. attachments may include, but are not limited to, text, multimedia content, files, combinations thereof, portions thereof, and the like. The additional data is attached to and delivered with the olfactogram data such that, for example but not limited to, any content among the additional data is displayed or the additional data is otherwise provided to a recipient device along with the scent dispensing instructions.

At S350, olfactogram data is generated. In an embodiment, the olfactogram data at least includes the scent dispensing instructions, and may further include the additional data. To this end, in some embodiments, S350 may further include attaching or otherwise adding the additional data to the scent dispensing instructions. The resulting package of data (i.e., including the scent dispensing instructions with or without the additional data) is the olfactogram data to be transmitted.

Returning to FIG. 2, at S260, the olfactogram data is transmitted. The olfactogram data may be sent to a recipient device (e.g., the recipient device 130, FIG. 1A), a scent dispensing device (e.g., the SDD 150, FIG. 1A), or both. When the olfactogram data has been transmitted to the recipient device, scent dispensing device, or both, the scent or scents of the olfactogram are caused to be emitted via scent dispensing device, subject to any conditions on scent emission, for example conditions defined by a user as discussed above with respect to S240. Any additional data of the olfactogram data (e.g., textual or multimedia content, files, etc.) may also be displayed or otherwise presented to the recipient of the olfactogram (e.g., a user of the recipient device).

At optional S270, updated scent essence data may be stored for subsequent use. In an embodiment, S270 includes determining an updated scent availability for the scent dispensing device based on the scent availability determined at S220 and the amount of scent dispensed as part of the olfactogram (e.g., as indicated among the olfactogram data). Updating the scent essence data based on the amount of scent indicated in the olfactogram data allows for maintaining accurate scent options for presentation to the user until additional scent essence data is requested, and may therefore allow for reducing use of computing and networking resources to maintain current scent availability.

At optional S280, an indicator of a scent dispensing result is received. The indicator may indicate, for example, that scent dispensing was successful, that scent dispensing failed, and the like. If the scent dispensing failed, S280 may further include presenting, to the user, an error notification or other notification indicating the failure.

It should be noted that the embodiments of FIGS. 2-3 are described with respect to a single recipient and a single scent dispensing device merely for simplicity, and that various aspects of the method of FIG. 2 may be performed with respect to multiple recipient devices, multiple scent dispensing devices, both, and the like, without departing from the scope of the disclosure. As a non-limiting example, scent essences status requests may be sent for multiple scent dispensing devices, and scent options may be presented with respect to each scent dispensing device's respectively availability.

Figure 4:
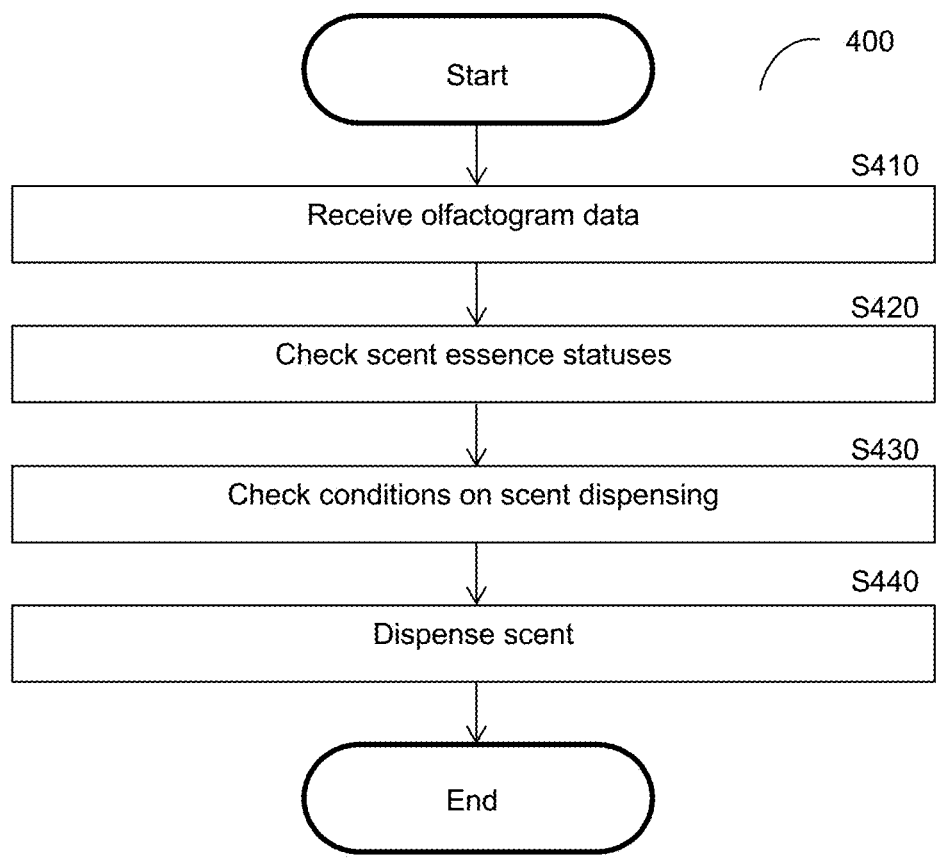
FIG. 4 is a flowchart illustrating a method for delivering olfactograms according to an embodiment.

FIG. 4 is a flowchart 400 illustrating a method for delivering olfactograms according to an embodiment. In an embodiment, the method is performed by the recipient device 130 or one of the recipient devices 130-1 through 130-3, FIGS. 1A-B. In another embodiment, the method is performed by the scent dispensing device 150 or one of the scent dispensing devices 150-1 through 150-3, FIGS. 1A-B.

At S410, olfactogram data is received from a sender device (e.g., the sender device 120, FIGS. 1A-B). The olfactogram data at least includes data corresponding to amounts of scent essence to be dispensed in order to produce a given scent or combination of scents. Any or all of the following steps may be realized by executing instructions among the olfactogram data.

At S420, scent essence statuses are checked with respect to a scent dispensing device. The scent dispensing device may be a recipient scent dispensing device such as, but not limited to, one of the recipient devices 130-1 through 130-3, FIG. 1B. The scent essence statuses are checked in order to determine an available amount of each scent essence in the scent dispensing device.

In an example implementation where the scent dispensing device includes multiple chambers, with each chamber containing a respective scent essence fluid, S420 may include checking the amount of scent essence fluid in each chamber or in each chamber containing a scent essence needed to produce the scent indicated in the olfactogram data.

At optional S430, any applicable conditions on scent dispensing are checked. In an embodiment, when the conditions are met, the scent or combination of scents is dispensed; otherwise, the scents are not dispensed, either at all or until the conditions are met.

The conditions may include, but are not limited to, conditions defined with respect to the scent essence statuses, predetermined conditions related to timing (e.g., a condition requiring that a recipient approve the scent dispensing prior to dispensing proceeding) conditions defined by a user, combinations thereof, and the like. For example, a condition may require that a scent availability of the scent dispensing device includes an amount of each scent essence used for dispensing each scent to be dispensed via the scent dispenser. More specifically, when one or more scents are to be dispensed, a current scent availability for the scent essence statuses includes a predetermined amount of each scent essence needed for dispensing the scents (e.g., based on a predetermined amount of one or more scent essences needed for dispensing each scent to be dispensed).

At S440, when any applicable conditions have been met, the scent or combination of scents is dispensed via the scent dispensing device.

Figure 5:
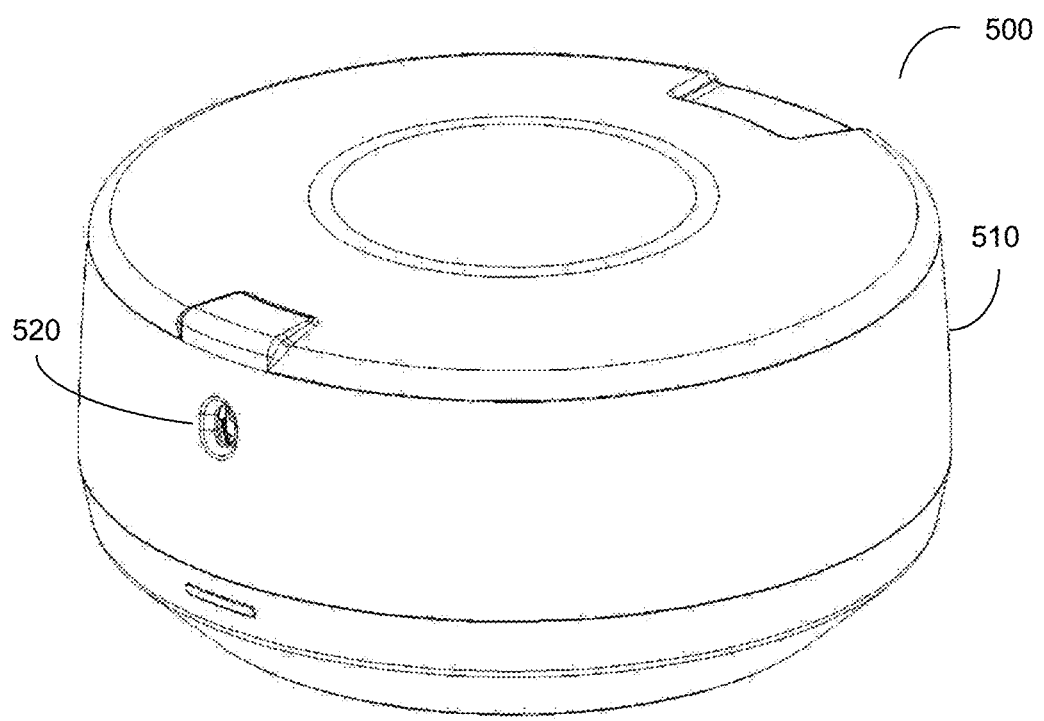
FIG. 5 is an illustration of a scent dispensing device which may be utilized in accordance with various disclosed embodiments.

FIG. 5 is an illustration of a scent dispensing device 500 which may be utilized in accordance with various disclosed embodiments. The scent dispensing device 500 depicted in FIG. 5 includes a housing 510 and an aperture 520. Scents dispensed as part of sending an olfactogram in accordance with various disclosed embodiments may be produced via components disposed in the housing 510 and ejected through the aperture 520, thereby dispensing the produced scent in an area surrounding the scent dispensing device 500. In some implementations, the aperture 520 may be an opening of a nozzle (not shown), which may be a pipe or tube adapted to direct an external flow of a scent disposed within the housing 510.

In some implementations, the scent dispensing device 500 includes a multi-chamber drum having a body including multiple chambers, where each chamber is adapted to receive a respective scent essence. A non-limiting example of such an implementation which may be utilized in accordance with various disclosed embodiments is shown in FIG. 6, which shows a multi-chamber drum 600 which may be utilized as part of a scent dispensing device in accordance with various disclosed embodiments.

Figure 6:
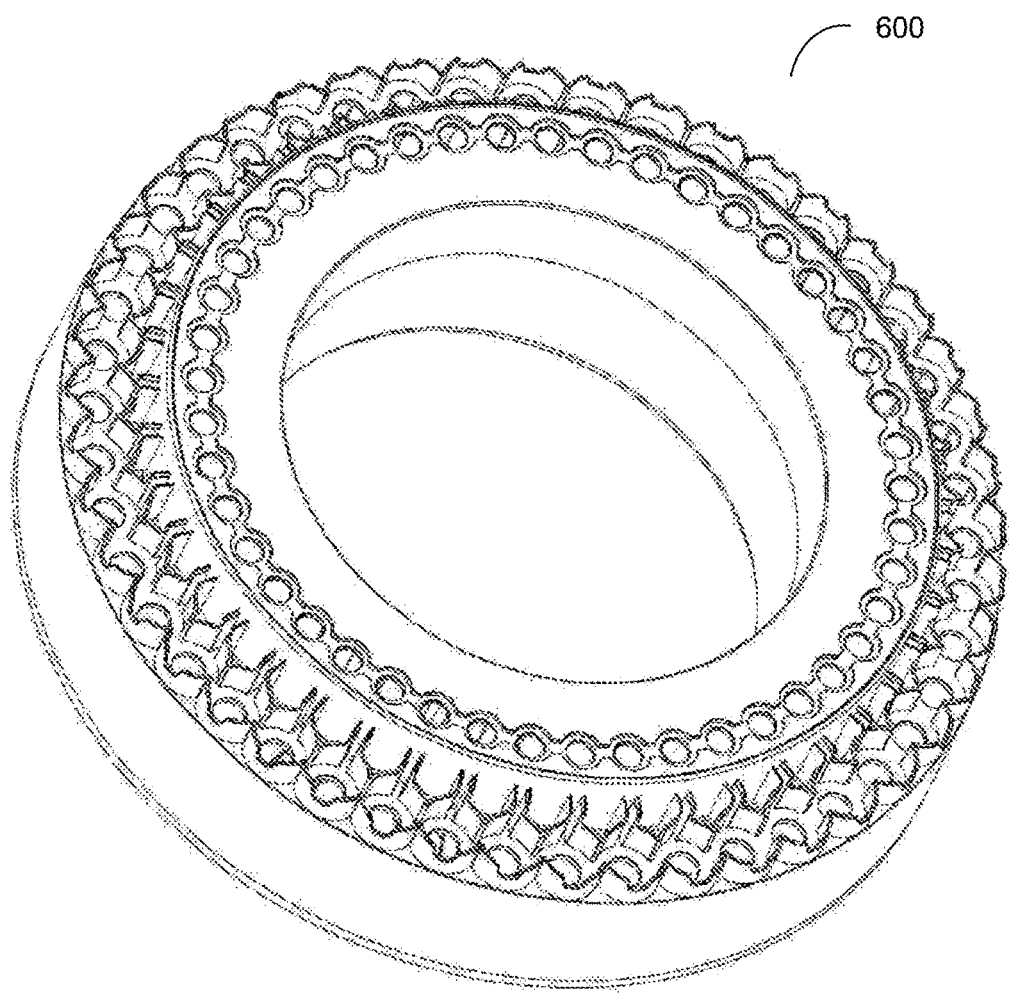
FIG. 6 is an illustration of a multi-chamber drum which may be utilized as part of a scent dispensing device in accordance with various disclosed embodiments.

The multi-chamber drum 600 depicted in FIG. 6 may further include actuators (not shown), with each actuator having an actuator port adapted to be aligned in a selected direction in relation to the body. The scent dispensing device may further include motors (not shown) such as a first motor configured to drive application of pressure in one of the actuators so as to induce emission of a scent essence through the respective actuator port. The second motor is configured to drive displacement of at least a portion of the body.

A non-limiting example design of a scent dispensing device which may be utilized in accordance with at least some of the disclosed embodiments is discussed in the above-referenced International Patent Application No. PCT/IL2022/051351, assigned to the common assignee, the contents of which are hereby incorporated by reference.

Figure 7:
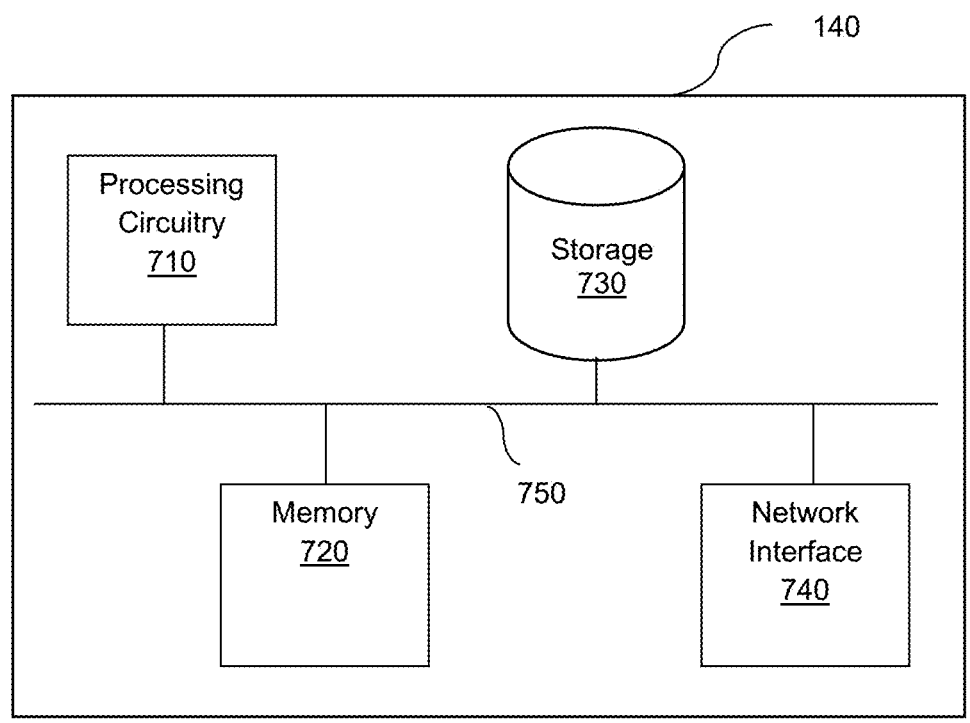
FIG. 7 is a schematic diagram of an olfactogram manager according to an embodiment.

FIG. 7 is an example schematic diagram of an olfactogram manager 140 according to an embodiment. The olfactogram manager 140 includes a processing circuitry 710 coupled to a memory 720, a storage 730, and a network interface 740. In an embodiment, the components of the olfactogram manager 140 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the olfactogram manager 140 to communicate with, for example, the sender device 120, the recipient device 130, the SDD 150, combinations thereof, and the like.

It should be understood that the embodiments described herein are not limited to the specific architecture illustrated in FIG. 7, and other architectures may be equally used without departing from the scope of the disclosed embodiments.

Figure 8:
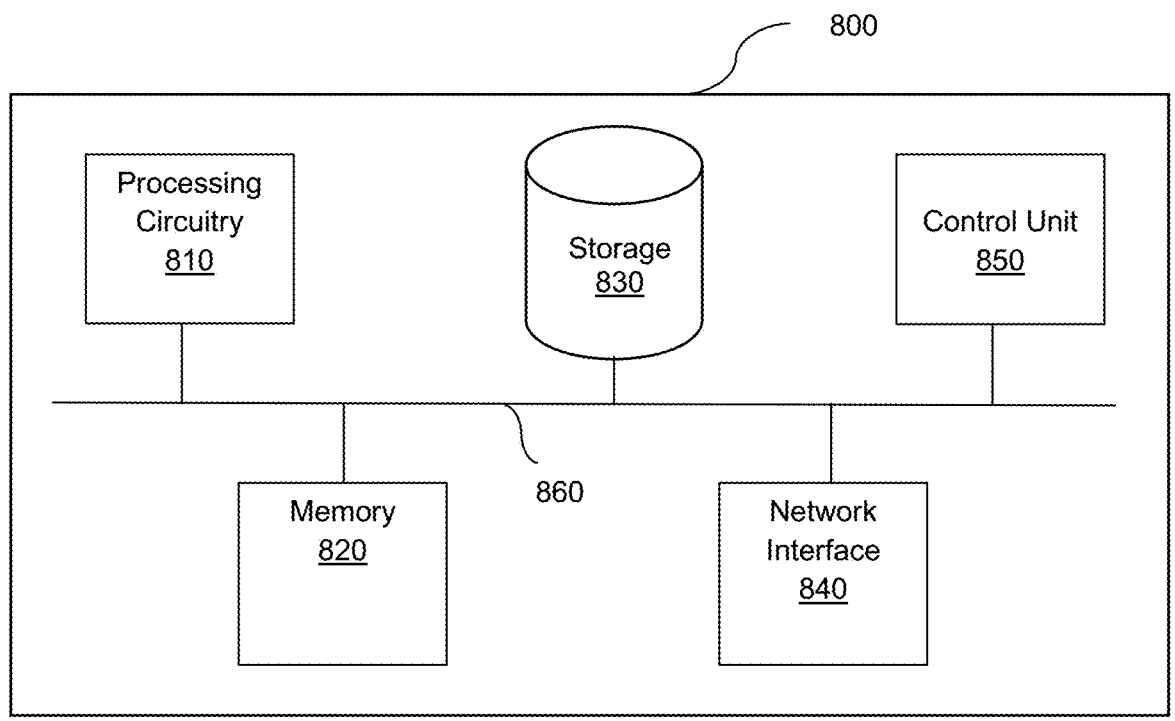
FIG. 8 is a schematic diagram of a hardware layer of a network-connected scent dispensing device according to an embodiment.

FIG. 8 is an example schematic diagram of a hardware layer 800 of a network-connected scent dispensing device according to an embodiment. The hardware layer 800 includes a processing circuitry 810 coupled to a memory 820, a storage 830, a network interface 840, and a control unit 850. In an embodiment, the components of the hardware layer 800 may be communicatively connected via a bus 860.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the hardware layer 800 to communicate with, for example, the sender device 120, the recipient device 130, the olfactogram manager 140, the SDD 150, a combination thereof, and the like.

The control unit 850 may be configured to control or otherwise communicate with a scent dispenser (e.g., the scent dispensing device 500, FIG. 5) in order to cause the scent dispenser to dispense scents pursuant to olfactograms sent as described herein. The control unit 850 may further receive signals from such a scent dispenser which indicate levels of scent essence fluid for different scent essences stored in the scent dispenser.

It should be understood that the embodiments described herein are not limited to the specific architecture illustrated in FIG. 8, and other architectures may be equally used without departing from the scope of the disclosed embodiments.

FIGS. 9A through 9D show illustrations of example messaging service interfaces 900A through 900D, respectively, through which olfactograms are selected which may be utilized in order to present scent options to a user.

The illustration 900A shows a text messaging interface. As part of the text messaging interface depicted in 900A, a perfume icon 910 representing an option to create an olfactogram is presented.

Figure 9A:
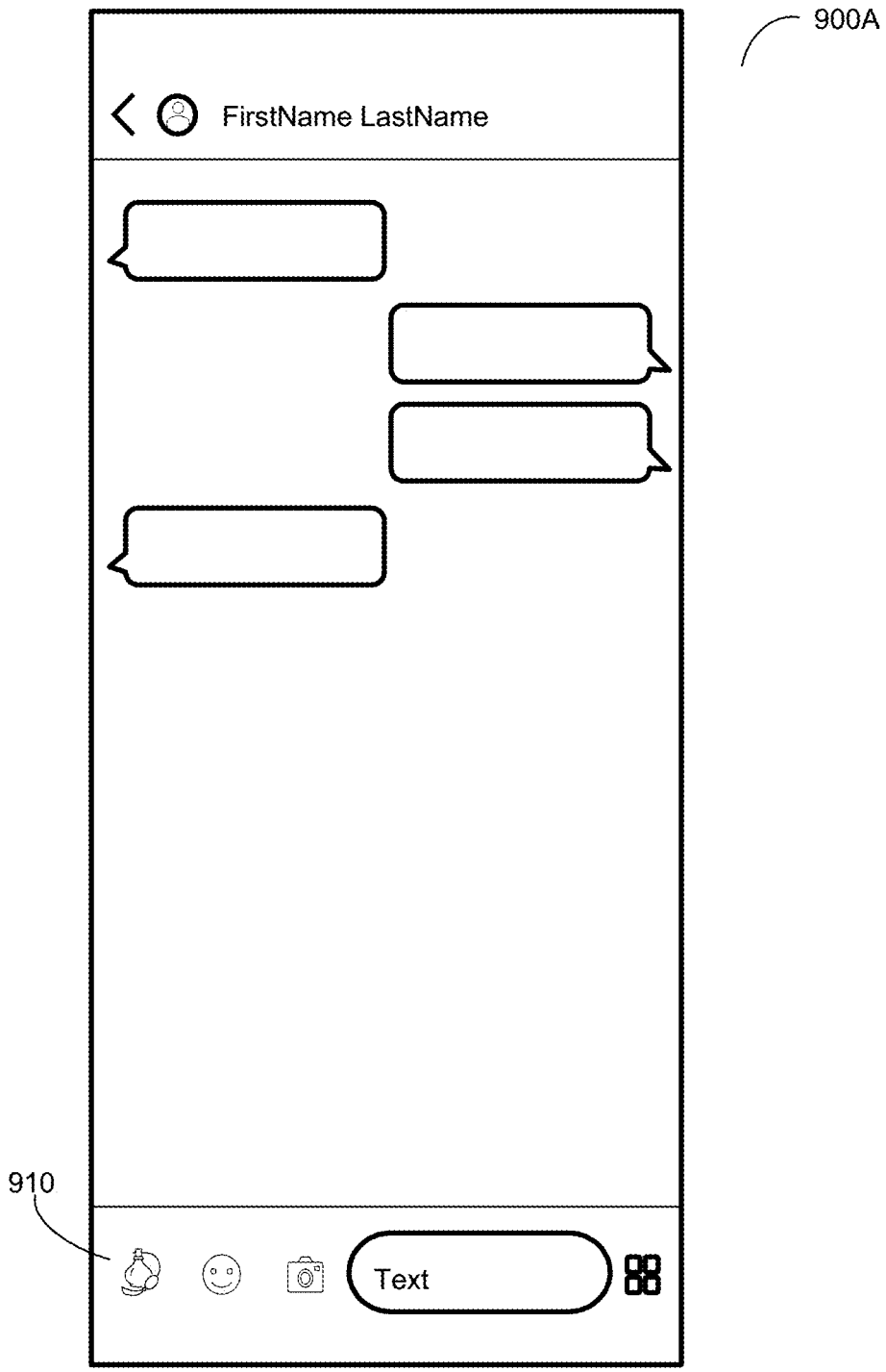
FIGS. 9A-9D are illustrations of example messaging service interfaces through which olfactograms are selected.
Figure 9B:
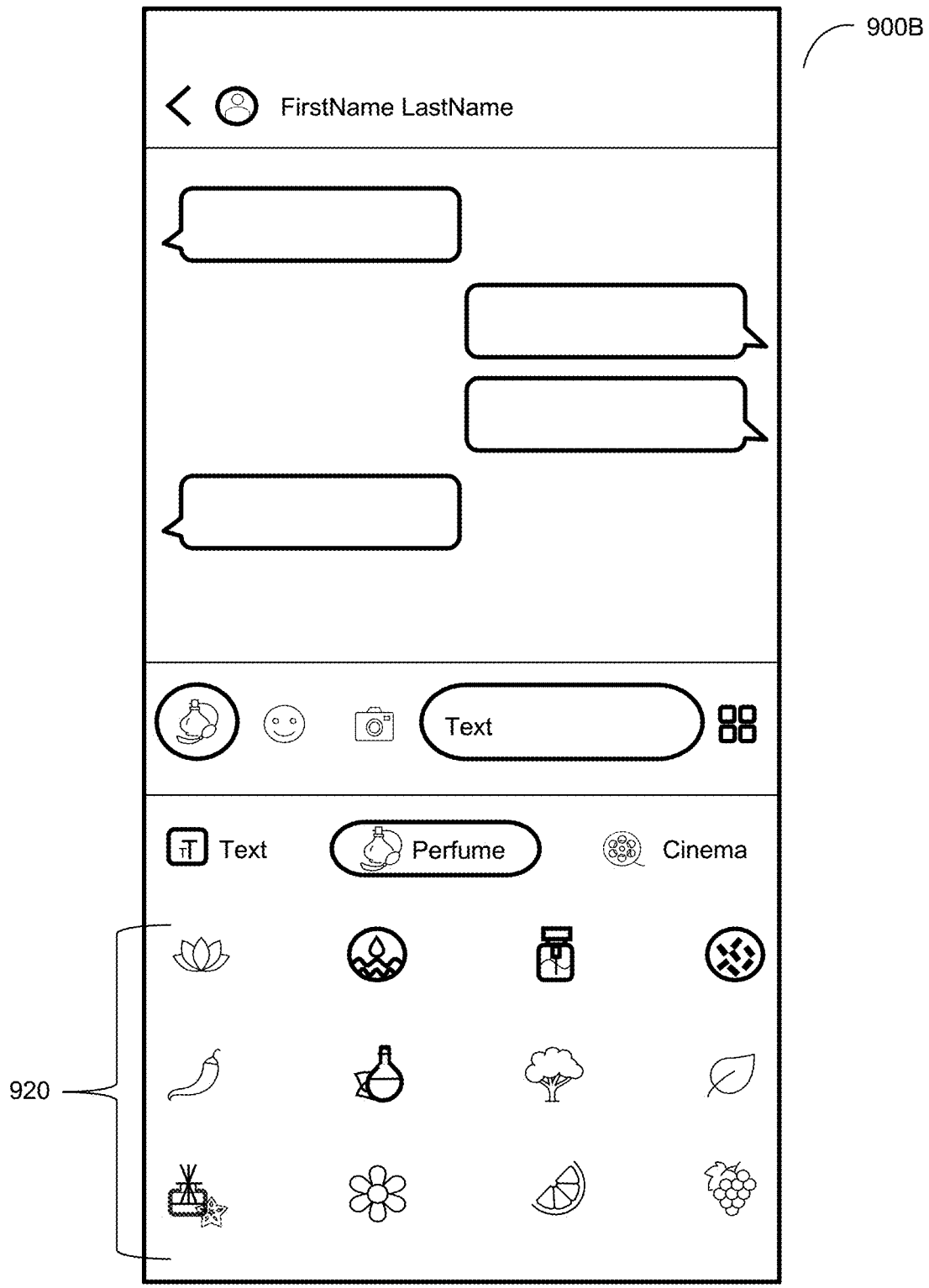

As depicted in FIG. 9B, when a user interacts with the perfume icon 910, multiple scent option icons 920 representing respective scent options are displayed to the user. In some implementations (not depicted), when a scent option represented by one of the icons 920 is not available (e.g., when a scent dispensing device of the other party or parties in the text message threat lack the necessary amounts scent essence to produce the scent represented by the scent option), the scent icons among the scent icons 920 which are unavailable may be greyed out or otherwise visually distinguished from available scent icons, or may be excluded from being displayed as part of the interface.

Figure 9C:
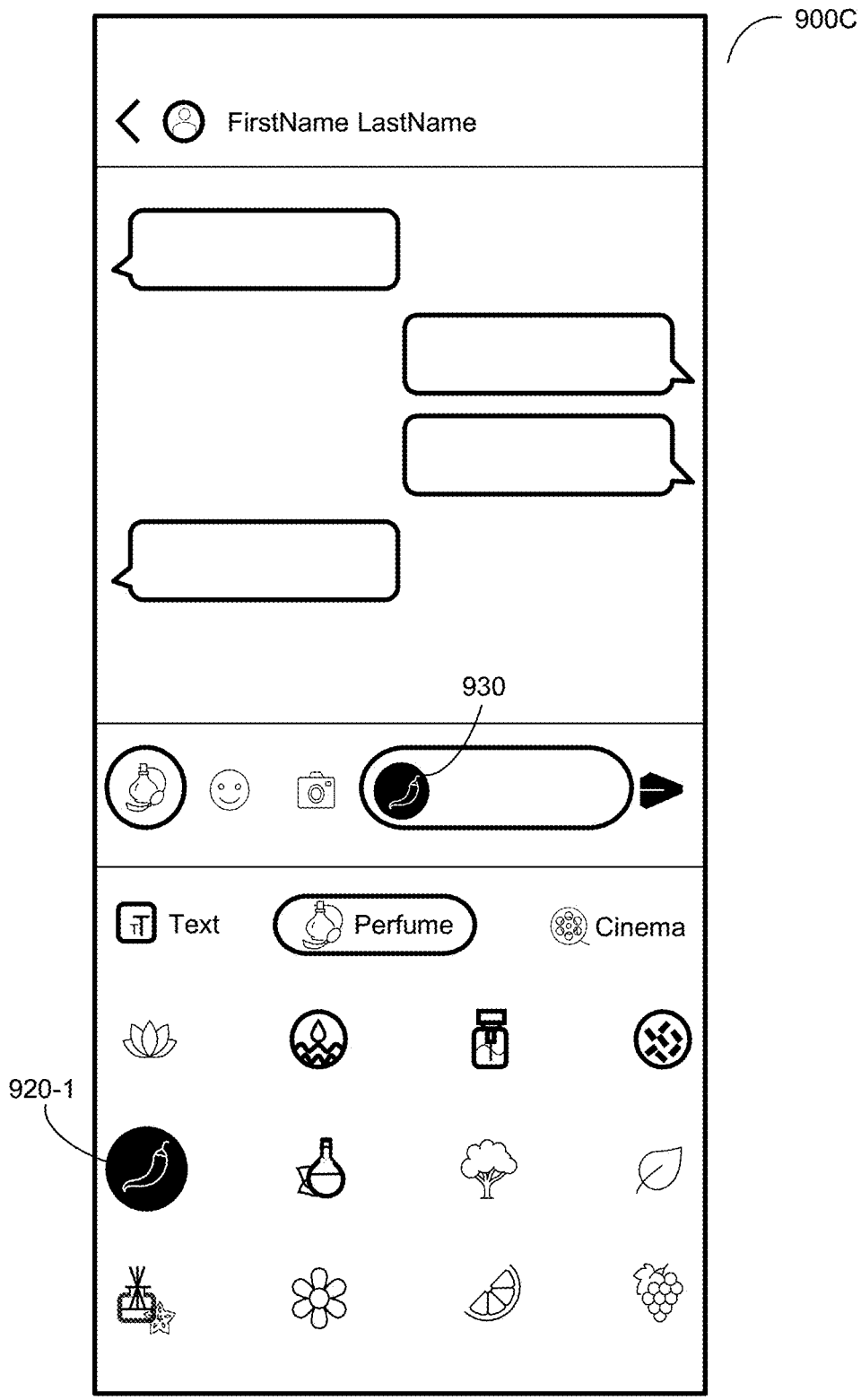

As depicted in FIG. 9C, when a user has interacted with a chili pepper scent option 920-1 representing a spicy aroma scent option, an instance 930 of the chili pepper icon appears in a text box in which a user may further add text or other content to the message, thereby optionally defining an olfactogram as being sent with such text or other content.

Figure 9D:
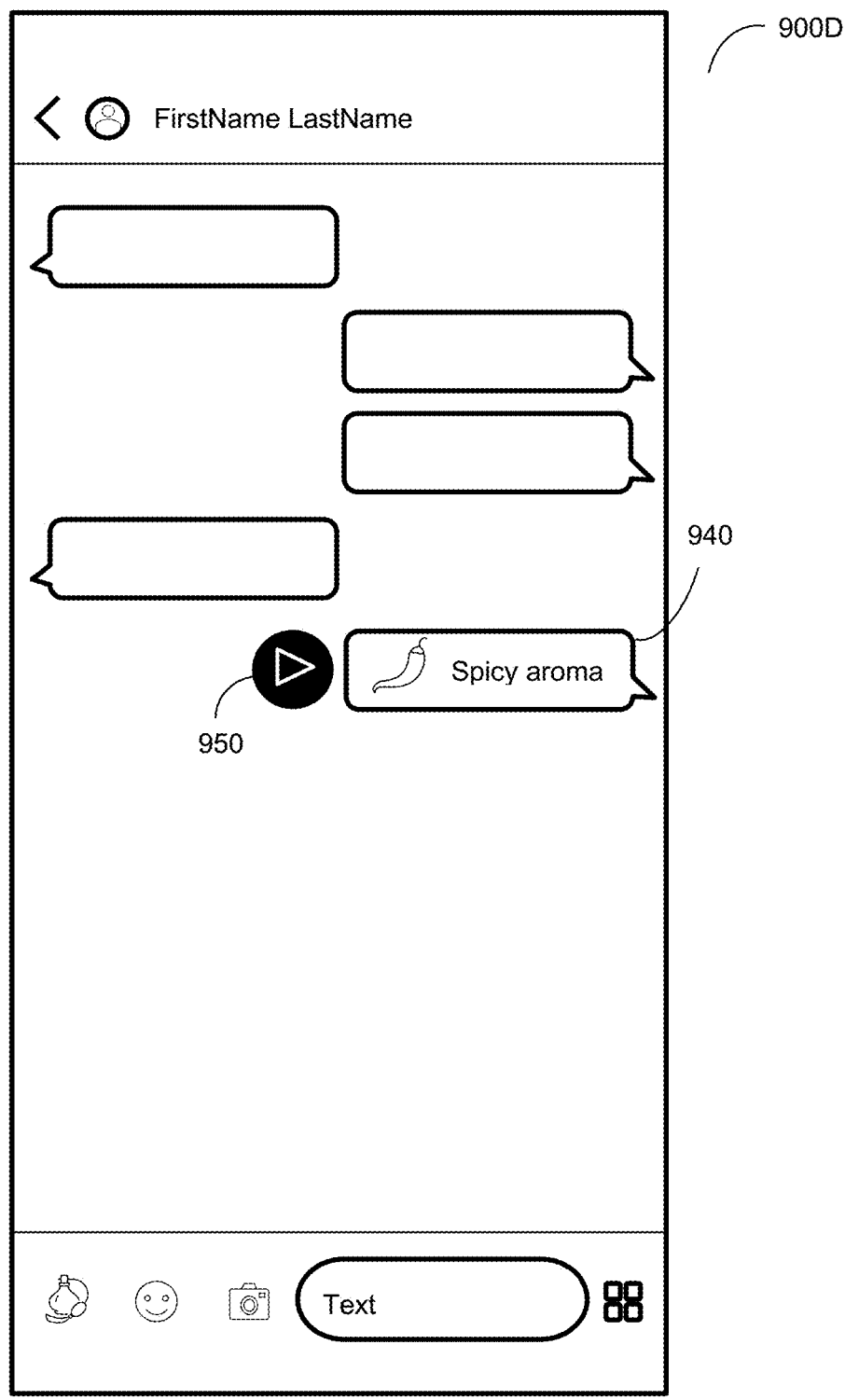

FIG. 9D shows an illustration 900D of another instance of the messaging interface depicted in FIGS. 9A through 9C demonstrating a visual representation of the olfactogram selected by the user as discussed with respect to FIGS. 9A through 9C. As shown in FIG. 9D, a chat message 940 showing the chili pepper icon and the words "Spicy aroma" is presented to a recipient of the message defined in FIGS. 9A through 9C. In accordance with certain embodiments disclosed herein, the non-limiting example interface shown in 900D also includes a play button 950. When the recipient interacts with the play button 950, the recipient's device may send instructions to emit the scent corresponding to the Spicy aroma represented by the chili pepper icon via a scent dispensing device of the recipient.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for delivering olfactograms, comprising:
   determining a scent availability of a scent dispensing device based on a plurality of scent essence statuses, wherein each scent essence status at least includes an amount of a respective scent essence disposed in the scent dispensing device;
   causing a plurality of scent options to be presented to a first user via a first user device, wherein the plurality of scent options is based on the scent availability;
   generating data indicating at least one scent to be dispensed by the scent dispensing device based on at least one user input provided by the first user via the first user device in response to the presentation of the plurality of scent options to the first user, wherein the generated data further indicates at least one condition, wherein the at least one condition includes an approval condition requiring that a second user of a second user device approve dispensing of the at least one scent; and
   transmitting the generated data, wherein the scent dispensing device is configured to dispense the at least one scent based on the transmitted data such that the scent dispensing device is further configured to dispense the at least one scent only when the second user has approved the dispensing of the at least one scent.

2. The method of claim 1, wherein generating the data indicating at least one scent to be dispensed by the scent dispensing device further comprises:
   generating a plurality of scent dispensing instructions, wherein the plurality of scent dispensing instructions includes instructions for causing the scent dispensing device to dispense the at least one scent, wherein the generated data includes the plurality of scent dispensing instructions.

3. The method of claim 2, wherein the scent dispensing device includes a drum having a plurality of chambers and a plurality of actuators, wherein each chamber of the plurality of chambers is adapted to receive a respective scent essence of the plurality of scent essences, wherein each actuator of the plurality of actuators is adapted to induce emission of the scent essence of a respective chamber of the plurality of chambers, wherein the plurality of scent dispensing instructions includes instructions for causing a motor to drive application of pressure on at least one actuator of the plurality of actuators in order to induce emission of at least one scent essence of the plurality of scent essences from at least one chamber of the plurality of chambers.

4. The method of claim 2, wherein the amount of each scent essence status is an amount of scent essence fluid of the respective scent essence in the scent dispensing device, wherein the plurality of scent dispensing instructions indicates an amount of each scent essence to be dispensed.

5. The method of claim 1, wherein the generated data is transmitted to a recipient device associated with the scent dispensing device, wherein the at least one condition includes a condition requiring that a user of the recipient device approves dispensing of the at least one scent.

6. The method of claim 1, wherein the at least one condition includes a condition requiring that the scent availability of the scent dispensing device includes an amount of each of at least one scent essence among the plurality of scent essences which corresponds to a predetermined amount of each of the at least one scent essence for the at least one scent to be dispensed by the scent dispenser.

7. The method of claim 1, further comprising:
identifying at least one attachment, wherein the generated data includes the at least one attachment, wherein the generated data is sent to a recipient device associated with the scent dispensing device.

8. The method of claim 1, wherein the scent dispensing device is a first scent dispensing device of a plurality of scent dispensing devices, wherein each of the plurality of scent dispensing devices is configured to dispense the at least one scent based on the transmitted data.

9. A non-transitory computer readable medium having stored thereon instructions for causing a processing circuitry to execute a process, the process comprising:
determining a scent availability of a scent dispensing device based on a plurality of scent essence statuses, wherein each scent essence status at least includes an amount of a respective scent essence disposed in the scent dispensing device;
causing a plurality of scent options to be presented to a first user via a first user device, wherein the plurality of scent options is based on the scent availability;
generating data indicating at least one scent to be dispensed by the scent dispensing device based on at least one user input provided by the first user via the first user device in response to the presentation of the plurality of scent options to the first user, wherein the generated data further indicates at least one condition, wherein the at least one condition includes an approval condition requiring that a second user of a second user device approve dispensing of the at least one scent; and
transmitting the generated data, wherein the scent dispensing device is configured to dispense the at least one scent based on the transmitted data such that the scent dispensing device is further configured to dispense the at least one scent only when the second user has approved the dispensing of the at least one scent.

10. A system for sending olfactograms, comprising:
a processing circuitry; and
a memory, the memory containing instructions that, when executed by the processing circuitry, configure the system to:
determine a scent availability of a scent dispensing device based on a plurality of scent essence statuses, wherein each scent essence status at least includes an amount of a respective scent essence disposed in the scent dispensing device;
cause a plurality of scent options to be presented to a first user via a first user device, wherein the plurality of scent options is based on the scent availability;
generating data indicating at least one scent to be dispensed by the scent dispensing device based on at least one user input provided by the first user via the first user device in response to the presentation of the plurality of scent options to the first user, wherein the generated data further indicates at least one condition, wherein the at least one condition includes an approval condition requiring that a second user of a second user device approve dispensing of the at least one scent; and
transmit the generated data, wherein the scent dispensing device is configured to dispense the at least one scent based on the transmitted data such that the scent dispensing device is further configured to dispense the at least one scent only when the second user has approved the dispensing of the at least one scent.

11. The system of claim 10, wherein generating the data indicating at least one scent to be dispensed by the scent dispensing device further comprises:
generating a plurality of scent dispensing instructions, wherein the plurality of scent dispensing instructions includes instructions for causing the scent dispensing device to dispense the at least one scent, wherein the generated data includes the plurality of scent dispensing instructions.

12. The system of claim 11, wherein the scent dispensing device includes a drum having a plurality of chambers and a plurality of actuators, wherein each chamber of the plurality of chambers is adapted to receive a respective scent essence of the plurality of scent essences, wherein each actuator of the plurality of actuators is adapted to induce emission of the scent essence of a respective chamber of the plurality of chambers, wherein the plurality of scent dispensing instructions includes instructions for causing a motor to drive application of pressure on at least one actuator of the plurality of actuators in order to induce emission of at least one scent essence of the plurality of scent essences from at least one chamber of the plurality of chambers.

13. The system of claim 11, wherein the amount of each scent essence status is an amount of scent essence fluid of the respective scent essence in the scent dispensing device, wherein the plurality of scent dispensing instructions indicates an amount of each scent essence to be dispensed.

14. The system of claim 10, wherein the generated data is transmitted to a recipient device associated with the scent dispensing device, wherein the at least one condition includes a condition requiring that a user of the recipient device approves dispensing of the at least one scent.

15. The system of claim 10, wherein the at least one condition includes a condition requiring that the scent availability of the scent dispensing device includes an amount of each of at least one scent essence among the plurality of scent essences which corresponds to a predetermined amount of each of the at least one scent essence for the at least one scent to be dispensed by the scent dispenser.

16. The system of claim 10, further comprising:
identifying at least one attachment, wherein the generated data includes the at least one attachment, wherein the generated data is sent to a recipient device associated with the scent dispensing device.

17. The system of claim 10, wherein the scent dispensing device is a first scent dispensing device of a plurality of scent dispensing devices, wherein each of the plurality of scent dispensing devices is configured to dispense the at least one scent based on the transmitted data.

\* \* \* \* \*